United States Patent
Weller et al.

(10) Patent No.: US 11,594,760 B2
(45) Date of Patent: Feb. 28, 2023

(54) ELECTROLYTE FOR AN ALKALI-SULFUR BATTERY, ALKALI-SULFUR BATTERY CONTAINING THE ELECTROLYTE, AND USES OF THE ELECTROLYTE

(71) Applicant: FRAUNHOFER-GESELLSCHAFT ZUR FÖRDERUNG DER ANGEWANDTEN FORSCHUNG E. V., Munich (DE)

(72) Inventors: Christine Weller, Dresden (DE); Holger Althues, Dresden (DE); Susanne Dörfler, Dresden (DE); Stefan Kaskel, Dresden (DE)

(73) Assignee: Fraunhofer-Gesellschaft zur förderung der angewandten Forschung e.V., Munich (DE)

(*) Notice: Subject to any disclaimer, the term of this patent is extended or adjusted under 35 U.S.C. 154(b) by 293 days.

(21) Appl. No.: 16/620,538

(22) PCT Filed: May 30, 2018

(86) PCT No.: PCT/EP2018/064225
§ 371 (c)(1),
(2) Date: Dec. 9, 2019

(87) PCT Pub. No.: WO2018/224374
PCT Pub. Date: Dec. 13, 2018

(65) Prior Publication Data
US 2021/0151801 A1    May 20, 2021

(30) Foreign Application Priority Data
Jun. 9, 2017    (DE) .................. 10 2017 209 790.6

(51) Int. Cl.
H01M 10/0569    (2010.01)
H01M 4/36    (2006.01)
(Continued)

(52) U.S. Cl.
CPC ....... H01M 10/0569 (2013.01); H01M 4/364 (2013.01); H01M 4/38 (2013.01);
(Continued)

(58) Field of Classification Search
CPC ......... H01M 10/0569; H01M 10/0525; H01M 10/0568; H01M 4/364; H01M 4/38; H01M 4/587; H01M 2004/028; H01M 2300/0037
See application file for complete search history.

(56) References Cited

U.S. PATENT DOCUMENTS

| 5,776,635 A * | 7/1998 | Gan ......................... H01M 4/58 429/231.95 |
| 7,354,680 B2 | 4/2008 | Mikhaylik |

(Continued)

FOREIGN PATENT DOCUMENTS

| EP | 0 829 911 A2 | 3/1998 |
| EP | 3 355 401 A1 | 8/2018 |

(Continued)

OTHER PUBLICATIONS

European Patent Office, Notification under Article 94 (3) EPC in European Patent Application No. 18 733 179.8 (Aug. 25, 2020).

(Continued)

*Primary Examiner* — Matthew J Merkling
(74) *Attorney, Agent, or Firm* — Leydig, Voit & Mayer, Ltd.

(57) ABSTRACT

The invention relates to an electrolyte, which is provided for an alkali-sulfur battery (e.g. for a Li—S battery). The electrolyte contains a non-polar, acyclic and non-fluorinated ether, a polar aprotic organic solvent, and a conducting salt for an alkali-sulfur battery. It has been found that, when such an electrolyte is used in an alkali-sulfur battery, a high-capacity, a low overvoltage, a high cycle stability, and a high (Continued)

Figure 3:
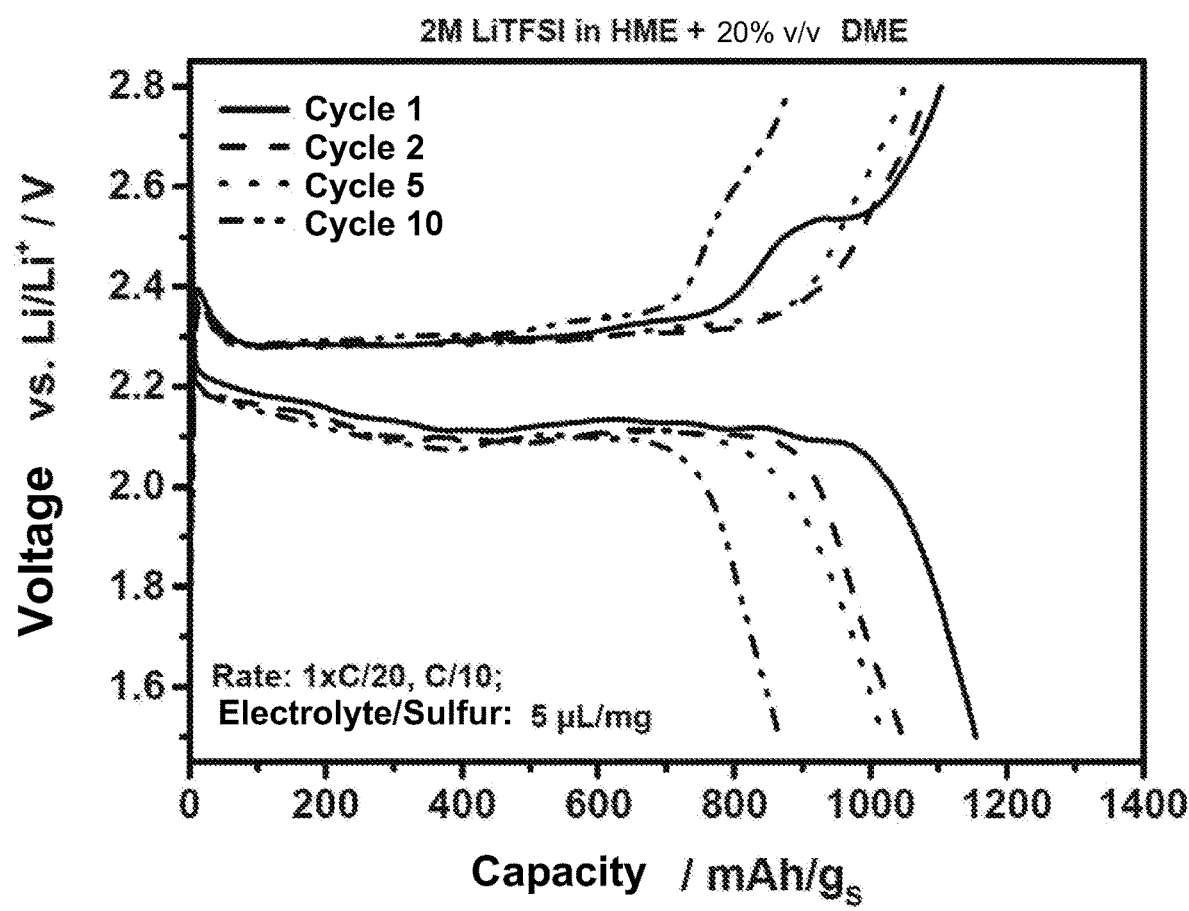

| Solvent | Donor number (based on Gutmann) | Acceptor number (based on Gutmann) |
|---|---|---|
| 1,2-dimethoxyethane (DME) | 24 | 10.2 |
| 1,3-dioxolane (DOL) | 18 | No Data |
| Sulfolane | 14.8 | 19.2 |
| Pyridine | 33.1 | 14.2 |
| Dimethyl sulfoxide | 29.8 | 19.3 |
| Acetonitrile | 14.1 | 18.9 |
| Tetrahydrofuran | 20 | 8.0 |
| Diglyme | 19 | 9.9 |
| Triglyme | 14 | No Data |
| Tetraglyme | 17 | No Data |
| Dibutyl ether | No Data | 18.1 |
| Dipropyl ether | 19 | No Data |

Coulomb efficiency can be achieved in the alkali-sulfur battery and, in addition, as compared with an alkali-sulfur battery which contains a fluorinated ether in the electrolyte, a considerably improved gravimetric energy density is obtained. The invention further relates to a battery comprising the electrolyte according to the invention and to uses of the electrolyte according to the invention.

15 Claims, 3 Drawing Sheets

(51) Int. Cl.
    *H01M 4/38*     (2006.01)
    *H01M 4/587*     (2010.01)
    *H01M 10/0525*     (2010.01)
    *H01M 10/0568*     (2010.01)
    *H01M 4/02*     (2006.01)

(52) U.S. Cl.
    CPC ....... *H01M 4/587* (2013.01); *H01M 10/0525* (2013.01); *H01M 10/0568* (2013.01); *H01M 2004/028* (2013.01); *H01M 2300/0037* (2013.01)

(56) References Cited

U.S. PATENT DOCUMENTS

| | | | |
|---|---|---|---|
| 9,406,975 B2 | 8/2016 | Watanabe et al. | |
| 2005/0147891 A1 | 7/2005 | Mikhaylik | |
| 2014/0106238 A1* | 4/2014 | Giroud | H01M 6/166 429/332 |
| 2015/0072248 A1 | 3/2015 | Watanabe et al. | |
| 2015/0318575 A1 | 11/2015 | Choi et al. | |
| 2017/0271677 A1 | 9/2017 | LeCuyer et al. | |
| 2018/0301739 A1* | 10/2018 | Park | H01M 10/0567 |
| 2020/0321579 A1* | 10/2020 | Song | H01M 50/457 |

FOREIGN PATENT DOCUMENTS

| | | |
|---|---|---|
| EP | 3 422 460 A1 | 1/2019 |
| EP | 3 429 020 A1 | 1/2019 |
| WO | WO 2013/141195 A1 | 9/2013 |
| WO | WO 2016/087759 A1 | 6/2016 |
| WO | WO 2016/174394 A1 | 11/2016 |
| WO | WO 2017/183810 A1 | 10/2017 |

OTHER PUBLICATIONS

German Patent Office, Office Action in German Patent Application No. 10 2017 209 790.6 (dated Jan. 24, 2018).

European Patent Office, International Search Report in International Application No. PCT/EP2018/064225 (dated Sep. 17, 2018).

European Patent Office, Written Opinion in International Application No. PCT/EP2018/064225 (dated Sep. 17, 2018).

International Bureau of WIPO, International Preliminary Report on Patentability in International Application No. PCT/EP2018/064225 (dated Dec. 10, 2019).

* cited by examiner

|  | Methoxy cyclohexane | Ethyl propyl ether* | Butyl ethyl ether | Hexyl methyl ether | Dihexyl ether | Dibutyl ether | Diiso-propyl ether | Phenetol |
|---|---|---|---|---|---|---|---|---|
| Miscible with 3M LiTFSI in TMS? | No | No | No | No | No | No | No | Yes |
| Solubility LiTFSI | Yes | Yes | Yes | Yes | No | Yes | Yes | No |
| Density | 0.88 g/mL | 0.73 g/mL | 0.75 g/mL | 0.77 g/mL | 0.79 g/mL | 0.77 g/mL | 0.73 g/mL | 0.97 g/mL |
| Smp. / Sdp. | -74°C / 135°C | - / 62°C | - / 92°C | - / 125°C | - / 228°C | -98°C / 141°C | -85°C / 69°C | -30°C / 170°C |

Figure 1

| Solvent | Donor number (based on Gutmann) | Acceptor number (based on Gutmann) |
|---|---|---|
| 1,2-dimethoxyethane (DME) | 24 | 10.2 |
| 1,3-dioxolane (DOL) | 18 | No Data |
| Sulfolane | 14.8 | 19.2 |
| Pyridine | 33.1 | 14.2 |
| Dimethyl sulfoxide | 29.8 | 19.3 |
| Acetonitrile | 14.1 | 18.9 |
| Tetrahydrofuran | 20 | 8.0 |
| Diglyme | 19 | 9.9 |
| Triglyme | 14 | No Data |
| Tetraglyme | 17 | No Data |
| Dibutyl ether | No Data | 18.1 |
| Dipropyl ether | 19 | No Data |

Figure 2

ELECTROLYTE FOR AN ALKALI-SULFUR BATTERY, ALKALI-SULFUR BATTERY CONTAINING THE ELECTROLYTE, AND USES OF THE ELECTROLYTE

CROSS-REFERENCE TO RELATED APPLICATIONS

This patent application is the U.S. national phase of International Application No. PCT/EP2018/064225, filed on May 30, 2018, which claims the benefit of German Patent Application No. 10 2017 209 790.6, filed Jun. 9, 2017, the disclosures of which are incorporated herein by reference in their entireties for all purposes.

In accordance with the invention, an electrolyte for an alkali-sulfur battery (e.g. for an Li—S battery) is provided. The electrolyte includes a nonpolar, acyclic, and non-fluorinated ether, a polar aprotic, organic solvent, and a conductive salt for an alkali-sulfur battery. It has been found that on the use of such an electrolyte in an alkali-sulfur battery, a high capacity, a low overvoltage, a high cycle stability, and a high coulombic efficiency can be achieved with the alkali-sulfur battery and additionally a considerably improved gravimetric energy density is obtained in comparison with an alkali-sulfur battery that includes a fluorinated ether in the electrolyte. A battery having the electrolyte in accordance with the invention and uses of the electrolyte in accordance with the invention are proposed.

So-called lithium polysulfides ($Li_2S_n$, where $2 \leq n \leq 8$) are frequently formed in lithium-sulfur batteries. Some of these polysulfide species are soluble in the common electrolytes (e.g. a mixture of DME/DOL with a conductive salt). The dissolved polysulfides can penetrate the separator contained between the cathode and the anode in lithium-sulfur batteries, can migrate to the anode, and are there reduced to lower polysulfide species. A reoxidation at the cathode follows the reduction of the polysulfides at the anode during the charging process, whereby a circulation process arises that substantially reduces the coulombic efficiency of the rechargeable battery (the so-called "polysulfide shuttle" mechanism).

If the battery is stored in the charged state, a formation of soluble polysulfides that are reduced at the anode can likewise occur. The capacity of the cell is thereby reduced (self-discharge). The cyclic stability is furthermore reduced by irreversible processes associated with these processes.

In addition, the known electrolyte systems require a high proportion of solvents in the cell for the effect (complete dissolving of the active cathode material). The electrolyte thus takes up the largest weight portion in comparison with the other cell components. A new electrolyte concept is thus essential for an increase of the energy density.

It is known in the prior art that the addition of compounds containing N—O (such as $LiNO_3$) results in a substantially improved coulombic efficiency and cyclic stability (see e.g. U.S. Pat. No. 7,354,680 B2). The mode of action of the compounds containing N—O evidently starts at the lithium anode. It is assumed that the formation of sulfitic species occurs at the surface of the lithium anode due to the compounds containing N—O (e.g. nitrate compounds).

The addition of $LiNO_3$ or of other compounds containing N—O does not, however, comprehensively solve the problem since the degradation of the anode is not completely prevented by the compounds containing N—O, which negatively influences the cyclic stability of the cell. The addition of $LiNO_3$ furthermore has an effect on the cell chemistry and possibly results in unknown or undesirable secondary reactions. $LiNO_3$ furthermore increases the weight of the electrolyte and thus the total weight of the battery in which the electrolyte is used. In addition, the compounds containing N—O do not have a permanent effect. In fact, continuous repair processes at the surface film of the anode consume $LiNO_3$ so that the protective effect of $LiNO_3$ drops continuously.

In the prior art, fluorinated ethers (in particular TTE or HFE) were used as components of the electrolytes to suppress the polysulfide shuttle mechanism (see e.g. WO 2013/141195 A1). A positive effect has been demonstrated by the use of the fluorinated ether; however, only utilizations of the active material of <70% could be reached. Particularly on the use of a battery in the mobile sector, a main disadvantage of the known solution comprising fluorinated ethers is the high weight proportion of the electrolyte in the cells of the battery. The reason for this is that fluorinated ethers have a higher specific density than the corresponding non-fluorinated ethers. With the same proportion of a specific ether, the gravimetric energy density of the fluorinated form of the ether (i.e. at least one H atom of the ether molecule is replaced with an F atom) is smaller in comparison with its non-fluorinated form.

Starting from this, it was the object of the present invention to provide an electrolyte for an alkali-sulfur battery that not only has a high capacity, high cyclic stability, low overvoltage, and high coulombic efficiency, but that also additionally provides a higher gravimetric energy density on a use in a battery.

The object is satisfied by the electrolyte for an alkali-sulfur battery described herein, by the alkali-sulfur battery described herein, and by the uses also described herein.

In accordance with the invention, an electrolyte for an alkali-sulfur battery (e.g. for a lithium sulfur battery) is provided comprising
a) a nonpolar, acyclic ether with the chemical formula

where
O is an oxygen atom; and
X and Y are each a saturated or unsaturated linear or cyclic hydrocarbon residue;
b) a polar aprotic organic solvent;
c) a conductive salt for an alkali-sulfur battery,
characterized in that the nonpolar acyclic ether is a non-fluorinated ether.

An ether that has no fluorine atoms is understood to be a non-fluorinated ether.

It has been found that an advantageous electrolyte for an alkali-sulfur battery can also be provided without the use of fluorinated ethers in that a nonpolar, acyclic, non-fluorinated ether is used instead of the fluorinated ethers typically used to suppress the polysulfide shuttle mechanism. It was observed that the solubility of polysulfides can also be reduced by these ethers in this case and that the polysulfide shuttle mechanism can thus be suppressed. To simultaneously maintain the low solubility of the electrolyte for polysulfides and to ensure sufficient solubility of the conductive salt in the electrolyte, a polar aprotic organic solvent (preferably an ether or a sulfone) is additionally added to the electrolyte.

A high capacity, a low overvoltage, a high cycle stability, and a high coulombic efficiency is obtained using the electrolyte in accordance with the invention on a use in alkali-sulfur batteries (e.g. Li-s batteries), with the gravimetric energy density being improved on the use of the electrolyte in batteries in comparison with batteries having fluorinated ethers in the electrolyte. This is above all a decisive advantage with batteries in mobile use. The mixture of the organic solvents of different polarities furthermore allow a fine adjustment of the solubility properties of the electrolyte with respect to the respectively used conductive salt, which on the one hand allows using the lowest possible electrolyte amounts in a battery and thus further increasing the gravimetric energy density and which on the other hand makes it possible to achieve a higher yield of active material.

The electrolyte in accordance with the invention can be characterized in that the carbon residues of X and Y of the nonpolar, acyclic, non-fluorinated ether together comprise at least five, preferably at least six, particularly preferably at least seven, very particularly preferably at least eight, in particular at least nine, optionally at least ten, carbon atoms. A nonpolar ether is particularly defined by this property within the framework of the present invention. The higher the total number of carbon atoms, the higher the boiling point of the ether, which is advantageous for the use of the electrolyte in alkali-sulfur batteries.

Furthermore, the carbon residues of X and Y of the nonpolar, acyclic, non-fluorinated ether can together have a maximum of 20, preferably of 18, particularly preferably a maximum of 16, very particularly preferably a maximum of 14, in particular a maximum of 12, optionally a maximum of 10, carbon atoms. A small number of carbon atoms is advantageous to the extent that the solubility of the conductive salt in the ether increases as the number of carbon atoms decreases.

The carbon residue of X and/or Y of the nonpolar, acyclic, non-fluorinated ether can in each case have at least two, preferably at least three, particularly preferably at least four, very particularly preferably at least five, optionally at least six, carbon atoms. A nonpolar ether is particularly defined by this property within the framework of the present invention. A higher number of carbon atoms of the carbon residue X and/or Y effects an increase in the boiling point of the ether and is thus advantageous for the use of the electrolyte in alkali-sulfur batteries.

The carbon residue of X and/or Y of the nonpolar, acyclic, non-fluorinated ether can furthermore have a maximum of ten, preferably a maximum of eight, particularly preferably a maximum of six, very particularly preferably a maximum of five, in particular a maximum of four, optionally a maximum of three, carbon atoms. The smaller the number of carbon atoms of the carbon residue X and/or Y of the nonpolar, acyclic, non-fluorinated ether, the higher the solubility of the conductive salt in the ether.

The nonpolar, acyclic, non-fluorinated ether can have a density of $\leq 1.4$ g/cm$^3$, preferably of $\leq 1.2$ g/cm$^3$, particularly preferably of $\leq 1.1$ g/cm$^3$, very particularly preferably of $\leq 1.0$ g/cm$^3$, in particular of $\leq 0.9$ g/cm$^3$, and optionally of $\leq 0.8$ g/cm$^3$. The smaller the density of the ether, the smaller its specific weight and thus the higher the gravimetric energy density of the alkali-sulfur battery that contains this ether in the electrolyte.

The nonpolar, acyclic, non-fluorinated ether can be selected from the group comprising ethyl propyl ether, dipropyl ether, diisopropyl ether, di-(1,2-dimethyl propyl) ether, methyl butyl ether, ethyl butyl ether, propyl butyl ether, dibutyl ether, diisobutyl ether, methyl pentyl ether, ethyl pentyl ether, propyl pentyl ether, butyl pentyl ether, dipentyl ether, 1-(2,2-dimethyl propoxy)-2,2-dimethyl propane, isopentyl ether, di-(1,2-dimethyl propyl) ether, methyl hexyl ether, ethyl hexyl ether, propyl hexyl ether, butyl hexyl ether, pentyl hexyl ether, dihexyl ether, methoxy cyclohexane, phenetol, 2-methoxy propane, 2-methoxy butane, 2-methoxy pentane, 2-methoxy hexane, 2-ethoxy propane, 2-ethoxy butane, 2-ethoxy pentane, 2-ethoxy hexane, and mixtures.

In a preferred embodiment, the polar aprotic, organic solvent has a Gutmann donor number of $\geq 14$, preferably of $\geq 16$, particularly preferably of $\geq 18$, very particularly preferably of $\geq 20$, in particular of $\geq 22$, optionally of $\geq 24$. The polar aprotic, organic solvent can have a Gutmann acceptor number of $\geq 8$, preferably of $\geq 9$, particularly preferably of $\geq 10$. A polar aprotic organic solvent is particularly defined by this property within the framework of the present invention. The donor number and/or acceptor number (determined on a Gutmann basis) of the polar aprotic, organic solvent in particular differ(s) from the donor number and/or acceptor number (determined on a Gutmann basis) of the nonpolar, acyclic, non-fluorinated ether.

The polar aprotic, organic solvent of the electrolyte in accordance with the invention can be selected from the group comprising ethers containing at least two O atoms, acetonitrile, pyridine, dimethyl sulfoxide, tetrahydrofuran, sulfone, and mixtures thereof.

The ether is particularly preferably an acyclic ether having the chemical formula A-(O—B)$_n$—O—C, where O is an oxygen atom and A, B, and C each represent a saturated or unsaturated linear or cyclic hydrocarbon residue, where B includes at least 2 carbon atoms and n$\geq$1, and where the ether is particularly preferably selected from the group comprising 1,2-dimethoxyethane, 1,3-dioxolane, 2-methoxyethyl ether, bis(2-(2-methoxy ethoxy)ethyl) ether and mixtures thereof. The sulfone is likewise particularly preferably selected from the group comprising cyclic or non-cyclic, aliphatic sulfones, preferably ethyl methyl sulfone, ethyl vinyl sulfone, and/or butyl sulfone, and cyclic aliphatic sulfones, preferably tetra methylene sulfone, where the sulfone is optionally a fluorinated sulfone or not a fluorinated sulfone.

The carbon residue B of the ether can have a maximum of four, preferably a maximum of three, particularly preferably a maximum of 2, carbon atoms and/or n can be $\leq 4$.

The volume ratio of the nonpolar, acyclic, non-fluorinated ether to the polar aprotic, organic solvent can amount to $\geq 1:1$ (v/v), preferably $\geq 2:1$ (v/v), particularly preferably $\geq 3:1$ (v/v), in particular 3:1 to 9:1 (v/v).

The conductive salt of the electrolyte in accordance with the invention can be a conductive salt for a lithium sulfur battery. The conductive salt is preferably i) selected from the group comprising LiPF$_6$, LiBF$_4$, LiClO$_4$, LiSO$_3$CF$_3$, LiN(SO$_2$F)$_2$, LiN(SO$_2$CF$_3$)$_2$, LiN(SO$_2$F)(SO$_2$CF$_3$), LiN(SO$_2$F)(SO$_2$C$_4$F$_9$), LiN(SO$_2$CF$_2$CF$_3$)$_2$, LiC(SO$_2$CF$_2$CF$_3$)$_3$, LiC(SO$_2$CF$_3$)$_3$, LiI, LiCl, LiF, LiPF$_5$(SO$_2$CF$_3$), LiPF$_4$(SO$_2$CF$_3$)$_2$, LiTFSI, and mixtures thereof, where the conductive salt preferably comprises or consists of LiTFSI; and/or ii) contained in a concentration of a maximum of 4 mol/l, preferably of 3 mol/l, particularly preferably a maximum of 2.0 mol/l, optionally of 1.0 mol/l, in the electrolyte.

The electrolyte in accordance with the invention preferably does not contain any LiNO$_3$.

The electrolyte can be liquid, of gel form, or solid, preferably liquid or of gel form, particularly preferably liquid.

An alkali-sulfur battery, preferably a lithium sulfur battery, is furthermore provided containing an electrolyte in accordance with the invention.

The alkali-sulfur battery (e.g. a lithium sulfur battery) can be characterized in that it has a cathode that contains sulfur particles and a carbon material, preferably sulfur particles having a mean particle size of a maximum of 1 μm (measured using an electron microscope), where the sulfur particles are particularly preferably present distributed homogeneously in the carbon material of the cathode, are very particularly preferably present in the pores of the carbon material, are in particular present in pores of an amorphous carbon material. The small particle size of the sulfur particles and the homogeneous distribution of the sulfur particles in pores of the carbon material improve the contact surface between the carbon material and the sulfur particles and thus the electrochemical accessibility of the active material of sulfur at the cathode.

The use of an electrolyte in accordance with the invention as an electrolyte in a battery, preferably as an electrolyte in an alkali-sulfur battery, particularly preferably as an electrolyte in a lithium sulfur battery, is furthermore proposed.

It is furthermore proposed to use a composition comprising or consisting of hexylmethyl ether and 1,2-dimethoxyethane as an electrolyte in an alkali-sulfur battery, preferably as an electrolyte in a lithium sulfur battery, where the composition optionally contains a conductive salt for an alkali-sulfur battery, preferably a conductive salt for a lithium sulfur battery, particularly preferably LiTFSI.

The subject matter in accordance with the invention will be explained in more detail with reference to the following Figures and examples without intending to restrict it to the specific embodiments shown here.

FIG. 1 shows by way of example a plurality of non-fluorinated, nonpolar, acyclic ethers usable in the electrolyte in accordance with the invention and their properties with respect to the solution capability of the conductive salt LiTFSI, its density, and its melting point and boiling point;

FIG. 2 shows by way of example a plurality of polar aprotic, organic solvents usable in the electrolyte in accordance with the invention and their Gutmann donor numbers and acceptor numbers; and FIG. 3 shows charge curves and discharge curves for the cycles 1, 2, 5, and 10 of a lithium sulfur battery that contains an electrolyte in accordance with the invention and has been produced as disclosed in Example 3.

1ST EXAMPLE—ELECTROLYTE IN ACCORDANCE WITH THE INVENTION FOR AN ALKALI-SULFUR BATTERY

A preferred electrolyte in accordance with the invention for an alkali-sulfur battery (e.g. for an Li—S battery) contains:
80% v/v hexyl methyl ether
20% v/v 1,2-dimethoxyethane
2 M LiTFSI

2ND EXAMPLE—SPECIFIC EXAMPLES FOR NONPOLAR, ACYCLIC, NON-FLUORINATED ETHERS

Some non-fluorinated, nonpolar, acyclic ethers that can be used in the electrolyte in accordance with the invention will be named by way of example in the following:
methoxy cyclohexane (density 0.88 g/mL);
ethyl propyl ether (density 0.88 g/mL);
butyl ethyl ether (density 0.88 g/mL);
hexyl methyl ether (density 0.88 g/mL);
dihexyl ether (density 0.88 g/mL);
dibutyl ether (density 0.88 g/mL);
diisopropyl ether (density 0.88 g/mL);
phenetol (density 0.88 g/mL).

All of the above-named non-fluorinated, nonpolar, acyclic ethers have a density of ≤0.97 g/mL that is considerably below the density of fluorinated, acyclic ethers used in the prior art whose density is typically below 1.4 g/mL.

An overview of further properties of these ethers can be found in FIG. 1.

3RD EXAMPLE—ALKALI-SULFUR BATTERY WITH AN ELECTROLYTE IN ACCORDANCE WITH THE INVENTION

The cathode was first provided for a Li—S battery as an alkali-sulfur battery in that a C/S composite (1:2, m:m) was manufactured by melting carbon (C) and sulfur (S) in a drying cabinet at 155° C. for 30 min. The C/S composite (97 wt %) was ground with PTFE (3 wt %) and was pressed at an elevated temperature in a milling process to form a cathode film. A lamination onto an aluminum film primed with carbon subsequently takes place. The sulfur load of the cathode amounted to approximately 2.1-2.2 mg-S/cm$^2$, it density to approximately 0.5 g/cm$^3$.

The provided cathode was subsequently installed in a button cell (CR2016). A button cell (CR2016) having the following composition was assembled for this purpose:
1×cathode (see above), diameter 15 mm;
1×separator (Toray F$_{12}$BMS), diameter 19 mm;
1×250 μm lithium film as the anode (China Energy Lithium), diameter 16.5 mm;
1×1 mm V2A spacer (16 mm diameter).

An electrolyte comprising 2 M LiTFSI (BASF, 99.9%) in 80% v/v hexyl methyl ether (HME, TCl, min. 98%), and 20% v/v 1,2-dimethoxyethane (DME, BASF 99.98%) was subsequently added to the button cell for the manufacture of the Li—S battery. The electrolyte-to-sulfur ratio amounted to 5 μl electrolyte/mg sulfur.

The Li—S battery was galvanostatically measured after the manufacture. The cycling (charging/discharging) took place between 1.5 V and 2.8 V vs. Li/li+ at a rate of C/10. In the first discharge step, a forming of the cell took place with a discharge at a rate of C/20.

The result is shown in FIG. 3. The charge/discharge curves illustrate the cycles 1, 2, 5, and 10.

On discharging, on a use of the electrolyte 2 M LiTFSI in the nonpolar, acyclic, non-fluorinated ether hexyl methyl ether (HME) and the ether 1,2-dimethoxyethane (DME) 8:2, v/v) a discharge voltage was reached of a constant approximately 2.1 V vs. Li/Li$^+$. A pronounced first plateau at 2.1 V to 2.3 V vs. Li/Li$^+$ is not obtained with this electrolyte.

In the charge process, a high overpotential was first observed that is caused by an Li$_2$S activation at the start of the charge process. A pronounced plateau was also displayed at approximately 2.3 V vs. Li/Li$^+$ on charging.

The suppression of a second plateau on charging and discharging indicates a suppression of long chain polysulfides, whereby it is shown that the polysulfide shuttle mechanism can also be successfully suppressed by the electrolyte in accordance with the invention without the addition of further additives.

The invention claimed is:
1. An alkali-sulfur battery containing an electrolyte for an alkali-sulfur battery, the electrolyte comprising
(a) a nonpolar, acyclic ether with the chemical formula X—O—Y, wherein O is an oxygen atom; and X and Y are each a saturated or unsaturated linear or cyclic hydrocarbon residue, wherein the carbon residues of X and Y together have at least five carbon atoms;

(b) a polar aprotic organic solvent, wherein the polar aprotic organic solvent is selected from an acyclic ether having the chemical formula A-(O—B)n-O—C, where O is an oxygen atom and A, B, and C each represent a saturated or unsaturated linear or cyclic hydrocarbon residue, where B includes at least 2 carbon atoms, and n ≥1, 1,3-dioxolane, acetonitrile, pyridine, dimethyl sulfoxide, sulfone, and mixtures thereof; and (c) a conductive salt for an alkali-sulfur battery, wherein the nonpolar acyclic ether is a non-fluorinated ether.

2. The alkali-sulfur battery in accordance with claim 1, wherein the carbon residues of X and Y together have (i) at least six carbon atoms; and/or (ii) have a maximum of 20 carbon atoms.

3. The alkali-sulfur battery in accordance with claim 1, wherein the carbon residue of X or Y has (i) at least two carbon atoms; and/or (ii) the carbon residue of X and/or Y respectively has a maximum of ten carbon atoms.

4. The alkali-sulfur battery in accordance with claim 1, wherein the nonpolar, acyclic, non-fluorinated ether has a density of 1.4 g/cm$^3$.

5. The alkali-sulfur battery in accordance with claim 1, wherein the nonpolar, acyclic, non-fluorinated ether is selected from the group consisting of ethyl propyl ether, dipropyl ether, diisopropyl ether, di-(1,2-dimethyl propyl) ether, methyl butyl ether, ethyl butyl ether, propyl butyl ether, dibutyl ether, diisobutyl ether, methyl pentyl ether, ethyl pentyl ether, propyl pentyl ether, butyl pentyl ether, dipentyl ether, 1-(2,2-dimethyl propoxy)-2,2-dimethyl propane, isopentyl ether, methyl hexyl ether, ethyl hexyl ether, propyl hexyl ether, butyl hexyl ether, pentyl hexyl ether, dihexyl ether, methoxy cylohexane, phenetol, 2-methoxy propane, 2-methoxy butane, 2-methoxy pentane, 2-methoxy hexane, 2-ethoxy propane, 2-ethoxy butane, 2-ethoxy pentane, 2-ethoxy hexane, and mixtures thereof.

6. The alkali-sulfur battery in accordance with claim 1, wherein the polar aprotic, organic solvent has (i) a Gutmann donor number of ≥14; and/or
(ii) a Gutmann acceptor number of 8.

7. The alkali-sulfur battery in accordance with claim 1, wherein the polar aprotic organic solvent is selected from the group consisting of 1,2-dimethoxyethane, 1,3-dioxolane, 2-methoxyethyl ether, bis(2-(2-methoxy ethoxy)ethyl) ether and mixtures thereof; and/or wherein B of the ether has a maximum of four carbon atoms and/or n is ≥4.

8. The alkali-sulfur battery in accordance with claim 1, wherein the volume ratio of the nonpolar, acyclic, non-fluorinated ether to the polar aprotic, organic solvent amounts to ≥1:1 (v/v).

9. The alkali-sulfur battery in accordance with claim 1, wherein the conductive salt (i) is selected from the group consisting of $LiPF_6$, $LiBF_4$, $LiClO_4$, $LiSO_3CF_3$, $LiN(SO_2F)_2$, $LiN(SO_2CF_3)_2$, $LiN(SO_2F)(SO_2CF_3)$, $LiN(SO_2F)(SO_2C_4F_9)$, $LiN(SO_2CF_2CF_3)_2$, $LiC(SO_2CF_2CF_3)_3$, $LiC(SO_2CF_3)_3$, LiI, LiCl, LiF, $LiPF_5(SO_2CF_3)$, $LiPF_4(SO_2CF_3)_2$, LiTFSI, and mixtures thereof; and/or (ii) is contained in a concentration of a maximum of 4 mol/l.

10. The alkali-sulfur battery in accordance with claim 1, wherein the electrolyte (i) does not contain any $LiNO_3$, and/or (ii) is liquid, of gel form, or solid.

11. The alkali-sulfur battery in accordance with claim 1, which has a cathode that contains sulfur particles and a carbon material.

12. A method of preparing an electrolyte for an alkali-sulfur battery comprising providing a composition comprising hexylmethyl ether and 1,2-dimethoxyethane as the electrolyte.

13. The alkali-sulfur battery in accordance with claim 1, wherein the alkali-sulfur battery contains a cathode, an anode, and a separator.

14. The alkali-sulfur battery in accordance with claim 13, wherein the cathode comprises sulfur and the anode comprises an alkali metal.

15. The alkali-sulfur battery in accordance with claim 14, wherein the cathode comprises sulfur and carbon and the anode comprises lithium.

* * * * *